United States Patent
Ika et al.

(10) Patent No.: US 8,108,230 B2
(45) Date of Patent: Jan. 31, 2012

(54) BUSINESS PROCESS AUTOMATION IN A HEALTH PLAN ORGANIZATION

(76) Inventors: Ravi Ika, Southboro, MA (US); Rudra Duddala, Westboro, MA (US); Madu Narahari, Whitinsville, MA (US); Poladas James, Worcester, MA (US); Venkat Balagani, South Grafton, MA (US); Murali Narasani, Westboro, MA (US); Sreekanth Belpu, Westboro, MA (US); Sudheer Bonala, Framingham, MA (US); Sasidhar Parvatham, Westboro, MA (US); Chandrasekar Jayaraman, Westboro, MA (US); Karthik Sridhar, Westboro, MA (US)

( * ) Notice: Subject to any disclaimer, the term of this patent is extended or adjusted under 35 U.S.C. 154(b) by 0 days.

(21) Appl. No.: 13/044,547

(22) Filed: Mar. 10, 2011

(65) Prior Publication Data

US 2011/0161120 A1    Jun. 30, 2011

Related U.S. Application Data

(62) Division of application No. 11/901,526, filed on Sep. 18, 2007.

(51) Int. Cl.
*G06Q 40/00* (2006.01)

(52) U.S. Cl. ........... 705/4; 705/1; 705/2; 705/7; 705/26; 705/35; 706/45; 707/10; 715/523

(58) Field of Classification Search ............... 705/1, 2, 705/4, 7, 26, 35; 706/45; 707/10; 715/523
See application file for complete search history.

(56) References Cited

U.S. PATENT DOCUMENTS

| | | | |
|---|---|---|---|
| 7,143,051 B1* | 11/2006 | Hanby et al. | 705/4 |
| 2003/0004909 A1* | 1/2003 | Chauhan et al. | 706/45 |
| 2004/0024622 A1* | 2/2004 | Knight | 705/7 |
| 2005/0015280 A1* | 1/2005 | Gabel et al. | 705/2 |
| 2005/0027606 A1* | 2/2005 | Pearson | 705/26 |
| 2005/0160023 A1* | 7/2005 | Pearson | 705/35 |
| 2005/0261939 A1* | 11/2005 | Augspurger et al. | 705/2 |
| 2006/0064313 A1* | 3/2006 | Steinbarth et al. | 705/1 |
| 2006/0179063 A1* | 8/2006 | Rose et al. | 707/10 |
| 2007/0250769 A1* | 10/2007 | Bass et al. | 715/523 |
| 2008/0177580 A1* | 7/2008 | Gabriel | 705/4 |

OTHER PUBLICATIONS

"Thoughtmill and theinsuranceXchange.com Develop first 'B2B Reverse Auction' Business Insurance Portal for Healthcare, High-Tech, Construction and Financial Industries", NPL from Business Wire, Jun. 20, 2000, 2 pages.*

* cited by examiner

*Primary Examiner* — Mary Cheung
*Assistant Examiner* — Sanjeev Malhotra
(74) *Attorney, Agent, or Firm* — Ash Tankha; Lipton, Weinberger & Husick

(57) ABSTRACT

The computer implemented method and system disclosed herein automates business processes of a health plan organization using a plurality of portals. The portals comprise a sales portal, a member portal, an employer portal, an administration portal, and a provider portal. Health plans are listed using the sales portal. A sales agent proposes at least one of the health plans to a consumer using the sales portal. The administration portal generates insurance quotes for the proposed health plans. The consumer enrolls for the proposed health plans using one of the member portal and the employer portal. The consumer is billed for the enrolled health plans based on the insurance quotes using the administration portal. The consumer pays a premium amount online for the enrolled health plans using the member portal or the employer portal. The administration portal then generates commissions for the sales agent for the enrolled health plans.

12 Claims, 3 Drawing Sheets

BUSINESS PROCESS AUTOMATION IN A HEALTH PLAN ORGANIZATION

CROSS REFERENCE TO RELATED APPLICATIONS

This application is a divisional of U.S. patent application Ser. No. 11/901,526, titled "Business Process Automation in A Health Plan Organization", filed on Sep. 18, 2007 in the United States Patent and Trademark Office.

BACKGROUND

This invention, in general, relates to a health plan organization. More particularly, this invention relates to automating business processes of the health plan organization.

Health plan organizations provide health care and health insurance coverage to a consumer. There are various business processes involved in the functioning of a health plan organization. These business processes involve many interactions between the departments of the health plan organization. The departments within a health plan organization may include, but not limited to, a marketing department, a sales department, a finance department, an underwriting department, and a customer services department. The business processes of each of these departments require manual intervention by brokers, sales representatives, underwriters, administrators, and customer service representatives. The activities of the departments including generating health plan proposals and insurance quotes, enrolling consumers for various health plans, underwriting, tracking of payments etc., would therefore be time consuming and may lead to inefficiency of the business processes. Therefore, there is a need for increasing efficiency of the business processes of the health plan organization and also integrating the business processes within the health plan organization in order to improve the quality of the health plans.

Moreover, the business processes in the health plan organization need to adhere to certain compliancy standards defined by the Health Insurance Portability and Accountability Act (HIPAA). These compliancy standards ensure privacy of consumer health information, secure electronic transactions, and simplified administration of the various business processes in the health plan organization. The HIPAA requires compliancy of standards for transactions such as enrollment, eligibility or benefit inquiries, referral certification and authorization, payment of premiums, etc.

Hence, there is a need for a computer implemented method and system for automating the business processes in a health plan organization and improving the efficiency of transactions between various departments of a health plan organization to improve the quality of the heath plans.

SUMMARY OF THE INVENTION

The computer implemented method and system disclosed herein addresses the need for automating business processes of a health plan organization. The above stated need is addressed by providing a plurality of portals for automating the business processes of the health plan organization.

The plurality of portals provided by the computer implemented method and system disclosed herein comprises a sales portal, a member portal, an employer portal, an administration portal, and a provider portal. A sales agent registers with the health plan organization using the sales portal. The sales agent may be a broker or an individual authorized by the health plan organization to sell the health plans. The administration portal authorizes the sales agent to access the sales portal. A plurality of health plans is then listed using the sales portal. The plurality of health plans comprises commercial health plans, dental plans, life insurance, vision insurance, long term disability insurance plans, short term disability insurance plans, Medicare health plans, and Medicaid health plans. The sales agent proposes at least one of the plurality of health plans to a consumer using the sales portal. The consumer may be one of a member and an employer. A member may be one of an individual, an individual with a family, an individual eligible for Medicare, a beneficiary or a recipient of a government program such as a special needs plan (SNP) or Medicaid, and a member of an employer group. The employer provides health care benefits to a group of members of a company through the health plans. The administration portal generates insurance quotes for the proposed health plans for the consumer.

The consumer then enrolls for the proposed health plans using one of the member portal and the employer portal. The step of enrolling of the consumer further comprises authorizing the consumer via an electronic correspondence compliant with Health Insurance Portability and Accountability Act (HIPAA) standards, using one of the sales portal, the employer portal, and the member portal. A provider renders health care services defined by the enrolled health plans to the consumer using the provider portal. The provider may also view membership and status of membership of the consumer enrolled for the health plans and track status of consumer claims using the provider portal. The administration portal then bills the consumer for the enrolled health plans. The step of billing the consumer includes generating invoices for the consumer based on the insurance quotes. The consumer then pays a premium amount online for the enrolled health plans using one of the member portal and the employer portal. Furthermore, the administration portal generates commissions for the sales agent for the enrolled health plans. The computer implemented method and system disclosed herein also comprises renewing the health plans and the insurance quotes for the consumer using the administration portal. The consumer may also request for effective changes to the enrolled health plans, consumer demographics, and constituents using one of the member portal and the employer portal.

The computer implemented method and system disclosed herein ensures increased efficiency of the business processes involved in the health plan organization by integrating the plurality of departments of the health plan organization using the plurality of portals. The disclosed method and system also adheres to the compliancy standards defined by the HIPAA, thereby improving the quality of the health plans.

BRIEF DESCRIPTION OF THE DRAWINGS

The foregoing summary, as well as the following detailed description of the embodiments, is better understood when read in conjunction with the appended drawings. For the purpose of illustrating the invention, exemplary constructions of the invention are shown in the drawings. However, the invention is not limited to the specific methods and instrumentalities disclosed herein.

DETAILED DESCRIPTION OF THE DRAWINGS

Figure 1:
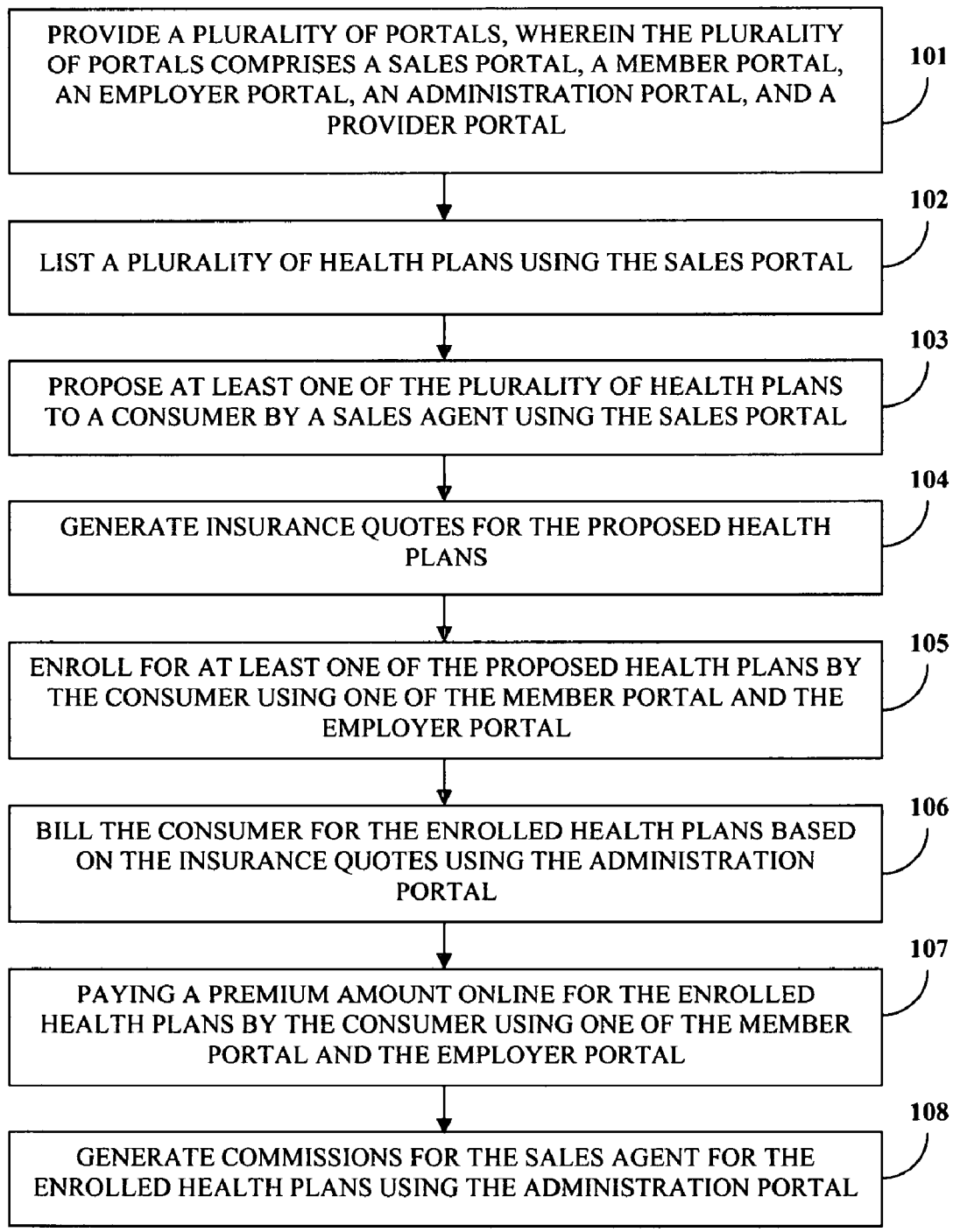
FIG. 1 illustrates a method of automating business processes of a health plan organization.

FIG. 1 illustrates a method of automating business processes of a health plan organization. The computer implemented method disclosed herein provides 101a plurality of portals. The plurality of portals comprises a sales portal 201, a member portal 202, an employer portal 203, an administration portal 204, and a provider portal 205. A sales agent registers with the health plan organization using the sales portal 201. The administration portal 204 authorizes the sales agent to access the sales portal 201. The sales agent maybe a broker or an individual authorized by the health plan organization to sell the health plans. The registered sales agent is authorized via an electronic correspondence compliant with predefined standards. The predefined standards are characterized by compliancy standards defined by the Health Insurance Portability and Accountability Act (HIPAA). The HIPAA protects health insurance coverage for a consumer. The HIPAA also determines the availability of health insurance plans for the consumer. The consumer may be one of a member and an employer. A member may be one of an individual, an individual with a family, an individual eligible for Medicare, a beneficiary or a recipient of a government program such as a special needs plan (SNP) or Medicaid, and a member of an employer group. The employer provides health care benefits to a group of members of a company through the health plans. Health care benefits may also be provided to members of the group even after termination of their employment. The registered sales agent receives an HIPAA compliant electronic mail (email) with a username and a password. The username and password combination provided to the registered sales agent authorizes the sales agent to access the sales portal 201, thereby ensuring security and privacy of information of the sales agent.

A plurality of health plans is listed 102 using the sales portal 201. The plurality of health plans comprises commercial health plans, Medicare health plans, Medicaid health plans, and other health plans including dental plans, life insurance, vision insurance, long term disability insurance plans, short term disability insurance plans, etc. Commercial health plans typically provide health care to consumers including members and employers. The employer provides health care benefits to a group of members of a company through the health plans. Medicare health plans may cover consumers of ages sixty-five years and above. Medicare health plans include hospital insurance and medical insurance. Hospital insurance may cover expenses of hospital stays of the consumer, whereas medical insurance covers outpatient requirements. Medicaid health plans provide medical coverage for consumers with low incomes and resources. The consumers covered by Medicaid health plans may include low-income parents, children, seniors, and consumers with disabilities.

The sales agent captures information of the consumer in order to propose 103 at least one of the plurality of health plans to the consumer using the sales portal 201. The captured consumer information comprises contact information, medical history details, and insurance history details of the consumer. The consumer information is provided by the consumer using one of the member portal 202 and the employer portal 203. For example, the sales agent proposes certain health plans covering illnesses to consumers requiring more intensive care management activities, such as consumers with asthma, diabetes, rare health conditions, or also consumers with specific unhealthy conditions or behaviors, such as obesity, smoking and sedentary lifestyles. The sales agent proposes the health plans to the consumer based on the captured consumer information. The sales agent may propose the health plans to the consumer via email using the sales portal 201.

Insurance quotes are then generated 104 for the health plans proposed by the sales agent using the administration portal 204. The step of generating the insurance quotes comprises evaluating health risks and health exposures of the consumer. The evaluation of risks is managed by the administration portal 204 using an underwriting module 204b. An underwriter analyzes the various factors to determine high and low insurance risks. The level of risks determines the quotations of the insurance premiums. The sales portal 201 then lists the insurance quotes for the proposed health plans for the consumer generated by the administration portal 204.

The consumer, namely a member or an employer may then enroll 105 for at least one of the proposed health plans using one of the member portal 202 and the employer portal 203 respectively. The member portal 202 is used by the member to enroll for the proposed health plans, whereas the employer portal 203 is used by the employer to enroll the group of members of a company for the proposed health plans. The step of enrolling of the consumer using one of the member portal 202 and the employer portal 203 comprises authorizing the consumer via an electronic correspondence compliant with predefined standards. The consumer may select a primary care physician (PCP) associated with the health plan organization using one of the member portal 202 and the employer portal 203. The consumer may also select the PCP for the consumer's family using one of the member portal 202 and the employer portal 203. The predefined standards are characterized by compliancy standards defined by the HIPAA. The consumer receives an HIPAA compliant electronic mail with a username and a password from the administration portal 204. The username and password combination provided to the consumer authorizes the consumer to access one of the member portal 202 and the employer portal 203, thereby ensuring security and privacy of information of the consumer. The consumer may compare the proposed health plans with the listed health plans for assessing benefits of the health plans proposed by the sales agent. The consumer enrolls for the health plans by comparing the insurance quotes of the proposed health plans. The employer verifies whether the group of members has enrolled for the proposed health plans.

A provider renders health care services defined by the enrolled health plans to the consumer using a provider portal 205. The provider of health care may be one of a primary care physician, a hospital network, or a medical lab network. When a particular provider is selected by the consumer as the PCP, the provider is kept informed through the provider portal 205. The health benefits of the consumer are also determined through the provider portal 205 based on the enrolled health plans. The provider then renders health care services defined by the enrolled health plans and the health plan contract to the consumer. The administration portal 204 bills 106 the consumer for the enrolled health plans based on the insurance quotes. A billing and commissions engine 204c of the administration portal 204 generates invoices for the consumer based on the insurance quotes. The administration portal 204 tracks the payment of the invoices by the consumer. The step of tracking the payment comprises sending reminders to the consumer to make the required payments. The consumer makes payments after receiving the invoices by using one of the member portal 202 and the employer portal 203. The consumer pays 107 a premium amount online for the enrolled health plans using one of the member portal 202 and the employer portal 203. The payments may be made online using the member portal 202 and employer portal 203 through one of credit cards, debit cards, electronic checks, and other modes of electronic payment.

The administration portal 204 then generates 108 commissions for the sales agent using the billing and commissions engine 204c, and sends the commission information to the sales portal 201 for viewing by the sales agent. Commissions are generated as remuneration for the health plans sold by the sales agent. Commission payments may be made to the sales agent using an electronic deposit method. The health plans and insurance quotes for a consumer may also be renewed using the administration portal 204 and sent to the sales portal 201 via a network 207. The administration portal 204 coordinates the business processes of the sales portal 201, the member portal 202, the employer portal 203, and the provider portal 205 via the network 207.

Figure 2:
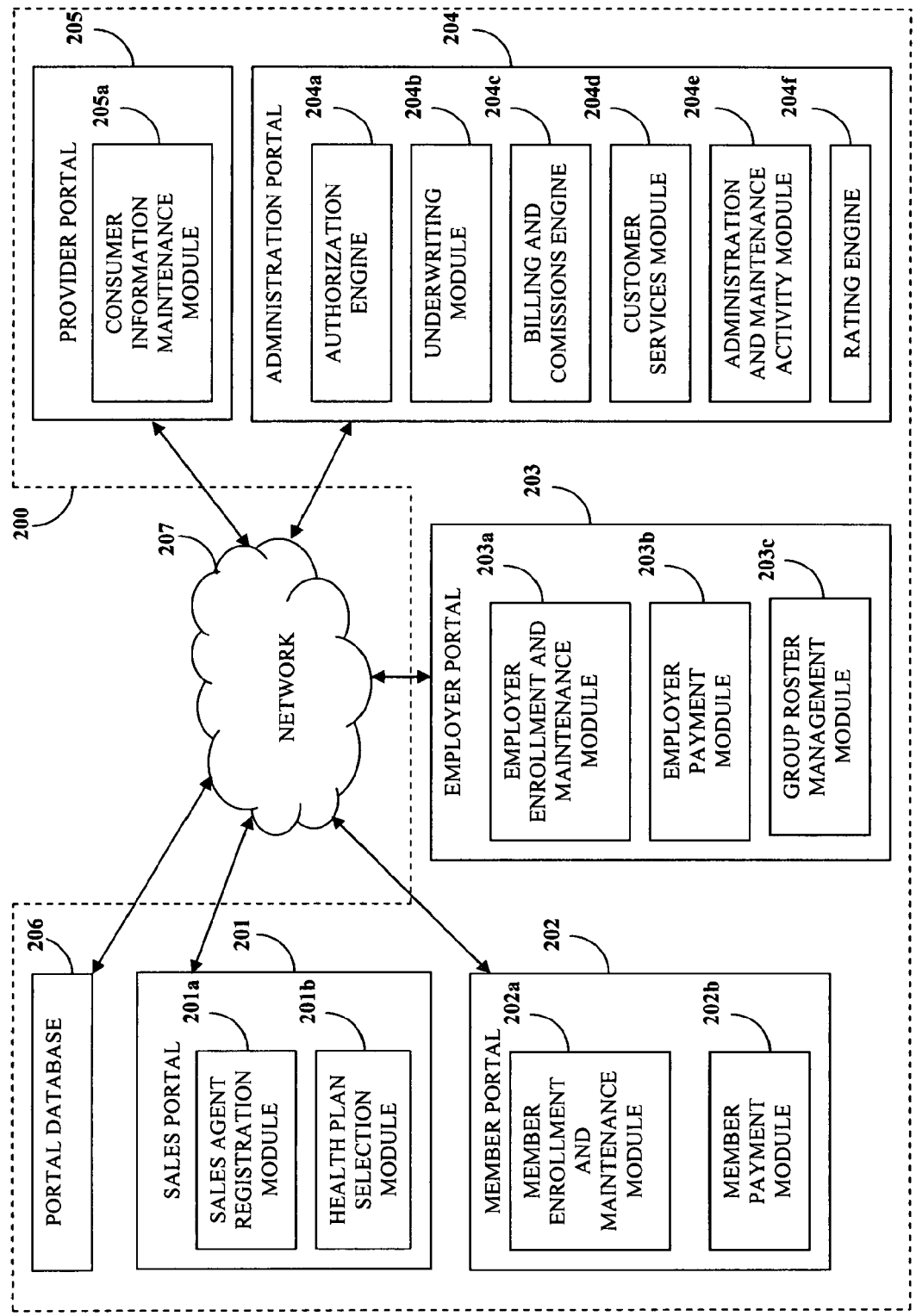
FIG. 2 illustrates a system for automating business processes of a health plan organization.

FIG. 2 illustrates a system for automating business processes of a health plan organization. The computer implemented system 200 disclosed herein comprises a plurality of portals. The plurality of portals comprises a sales portal 201, a member portal 202, an employer portal 203, an administration portal 204, and a provider portal 205. A plurality of health plans such as commercial health plans, Medicare health plans, and Medicaid health plans are listed using the sales portal 201. The sales portal 201 comprises a sales agent registration module 201a and a health plan selection module 201b. The sales agent registration module 201a enables the registration of the sales agent with the health plan organization. The administration portal 204 authorizes the registered sales agent via an electronic correspondence compliant with predefined standards using an authorization engine 204a. The predefined standards are characterized by compliancy standards defined by the HIPAA as explained in the detailed description of FIG. 1. The registered sales agent receives an HIPAA compliant electronic mail with a username and a password. The username and password combination provided to the registered sales agent authorizes the sales agent to access the sales portal 201. The sales agent information comprising sales agent identification, sales agent login details, and summary of the sales agent commissions is stored in a portal database 206.

The health plan selection module 201b of the sales portal 201 enables the sales agent to select health plans for the consumer. The sales agent selects the health plans based on the information provided by the consumer. The consumer information comprises contact information, medical history details, and insurance history details of the consumer. The consumer information is provided by the consumer using one of the member portal 202 and the employer portal 203. The consumer information comprising the login details of the consumer, contact information of the consumer, medical history details of the consumer, a summary of the enrolled health plans, consumer identification number, consumer name, date of service, type of service, provider details, total billable service details, amounts of service charges etc., is stored in the portal database 206. The health plans to be proposed to the consumer may be compared across the list of health plans to determine the benefits of the proposed health plans. The sales agent then uses the health plan selection module 201b to propose at least one of the selected health plans to the consumer. The administration portal 204 generates insurance quotes for the health plans proposed by the sales agent. Generating insurance quotes requires the evaluation of health risks and health exposures of the consumer. The health plan selection module 201b also lists insurance quotes for the proposed health plans generated by the administration portal 204. The administration portal 204 communicates with the sales portal 201 via a network 207. The sales agent proposes the health plans to the consumer via electronic mail (email) using the health plan selection module 201b of the sales portal 201.

The member portal 202 of the computer implemented system 200 disclosed herein comprises a member enrollment and maintenance module 202a and a member payment module 202b. The administration portal 204 authorizes a member via an electronic correspondence compliant with predefined standards using the authorization engine 204a. The predefined standards are characterized by compliancy standards defined by the HIPAA. The member receives an HIPAA compliant electronic mail with a username and a password. The username and password combination provided to the member authorizes the member to access the member portal 202. The administration portal 204 communicates with the member portal 202 via the network 207.

On receiving access to the member portal 202, the member may view the health plans and insurance quotes proposed by the sales agent. The member portal 202 communicates with the sales portal 201 via the network 207. The member may compare the proposed health plans with the list of health plans for assessing the benefits of the proposed health plans. The member enrollment and maintenance module 202a of the member portal 202 is used for enrolling the member for at least one of the health plans proposed by the broker. The member may select a primary care physician (PCP) associated with the health plan organization using the member portal 202. The member may also select the PCP for the member's family using the member portal 202. The member may also waive coverage of certain health plans depending on the needs of the member. After enrollment for at least one of the proposed health plans, the member may request for identification cards and change member information including login details, contact information etc., using the member enrollment and maintenance module 202a of the member portal 202. The member information is stored in the portal database 206.

The member payment module 202b of the member portal 202 enables the member to make payments for the enrolled health plans. The member receives invoices generated by a billing and commissions engine 204c of the administration portal 204 via the network 207. The member pays a premium amount online for the enrolled health plans using the member portal 202. The member makes payments for the enrolled health plans online using the member payment module 202b through one of credit cards, debit cards, electronic checks, and other modes of electronic payment. The computer implemented system 200 disclosed herein also comprises a provider portal 205 used by a provider to render health care services defined by the enrolled health plans to the consumer. The provider may be one of a primary care physician, a hospital network, and a medical lab network. The member may select a provider based on the requirements of the member through the member portal 202. Once the selection is made, the member information including the health benefit information is updated in a consumer information maintenance module 205a of the provider portal 205.

The employer portal 203 of the computer implemented system 200 disclosed herein comprises an employer enrollment and maintenance module 203a, an employer payment module 203b, and a group roster management module 203c. The administration portal 204 authorizes the employer via an electronic correspondence compliant with predefined standards using the authorization engine 204a. The predefined standards are characterized by compliancy standards defined by the HIPAA. The employer receives an HIPAA compliant electronic mail with a username and a password. The username and password combination provided to the employer authorizes the employer to access the employer portal 203. The administration portal 204 communicates with the employer portal 203 via the network 207. The employer of a company provides health care benefits to a group of members of the company through the health plans. The group of members may be further divided into subgroups based on the number of members. For example, the group of members of the company may be divided into small groups of fifty members and large groups of fifty and above members. The members of a company may also be grouped into active members, terminated members, etc. The information about the groups of members is maintained using the group roster management module 203c.

The employer uploads preliminary group census information or detailed group census information to the portal database 206 using the group roster management module 203c. The preliminary group census information contains mandatory group member details such as age, gender, applicable tier and zip code of location. The preliminary group census information may also comprise email addresses and Medicare eligibility of the group. The detailed group census information contains group member details such as first name, last name, age, gender, applicable tier, zip code of location, date of birth, email address, and Medicare eligibility, wherein age, gender, applicable tier and zip code of location are mandatory details. The employer may either specify the member's age or provide a date of birth. The employer may also designate a sales agent or a broker agency for each group of members. The employer may view, verify, and update group census information using the employer portal 203. The employer may also select a primary care physician (PCP) associated with the health plan organization using the employer portal 203. The employer may also select the PCP for the member's family using the employer portal 203.

The employer portal 203 enables the employer to view the health plans and insurance quotes proposed by the sales agent. The employer portal 203 communicates with the sales portal 201 via the network 207. The employer may compare the proposed health plans with the list of health plans for assessing the benefits of the proposed health plans for the group of members. The employer enrolls the group of members for at least one of the health plans proposed by the sales agent using the employer enrollment and maintenance module 203a of the employer portal 203. The employer may also waive coverage of certain health plans depending on the needs of the group of members. After enrollment for at least one of the proposed health plans, the employer may request for identification cards and change login details, contact information, and group census information etc., using the employer enrollment and maintenance module 203a of the employer portal 203. The employer manages the details of the group members using the group roster management module 203c of the employer portal 203.

The employer payment module 203b of the employer portal 203 enables the employer to make payments for the enrolled health plans. The employer receives invoices generated by a billing and commissions engine 204c of the administration portal 204 via the network 207. The employer pays a premium amount online for the enrolled health plans using the employer portal 203. The employer makes payments for the enrolled health plans online using the employer payment module 203b through one of credit cards, debit cards, electronic checks, and other modes of electronic payment. The computer implemented system 200 disclosed herein further comprises a provider portal 205 used by a provider to render health care services defined by the enrolled health plans to the group of members of the company. The employer may select a provider based on the requirements of the group of members through the employer portal 203.

The provider portal 205 comprises a consumer information maintenance module 205a for maintaining and managing information of the consumer associated with the provider. The consumer information maintenance module 205a also submits and tracks the status of provider claims, and views the status of membership of the consumer. The consumer information maintenance module 205a also informs the provider when any new consumers select that provider as the PCP. The consumer's health benefits are determined and accessed through the consumer information maintenance module 205a of the provider portal 205 based on the health plans enrolled by the consumer and as proposed by the sales agent.

In one embodiment of the computer implemented system 200 disclosed herein, the members of the group may also be provided with health care benefits after termination from employment of the company as defined by the statutes of the Consolidated Omnibus Budget Reconciliation Act (COBRA). COBRA enables members of the group to maintain health insurance coverage of the health plans after termination of employment. The computer implemented system 200 disclosed herein manages health insurance coverage of terminated members of the group by generating COBRA letters for the terminated members of the group, and updating the status of the terminated members. The administration portal 204 generates monthly coupons for the terminated members. The generated COBRA letters and coupons may be viewed by the employer using the employer portal 203. The billing and commissions engine 204c of the administration portal 204 generates invoices for the terminated members and tracks payment of the invoices via the network 207.

The administration portal 204 of the computer implemented system 200 disclosed herein comprises an authorization engine 204a, an underwriting module 204b, a billing and commissions engine 204c, a customer services module 204d, an administrative and maintenance activity module 204e, and a rating engine 204f. The authorization engine 204a authorizes the sales agent, the member, and the employer via an electronic correspondence compliant with Health Insurance Portability and Accountability Act standards as explained in the detailed description of FIG. 1. The authorization engine 204a authorizes the consumer with a unique set of username and password. The authorization engine 204a authorizes the sales agent to access the sales portal 201, the member to access the member portal 202, and the employer to access the employer portal 203. The authorization engine 204a of the administration portal 204 communicates with the sales portal 201, the member portal 202, and the employer portal 203 via the network 207.

The rating engine 204f generates insurance quotes for the health plans proposed by the sales agent. The underwriting module 204b of the administration portal 204 further modifies the insurance quotes generated by the rating engine 204f based on the evaluation of the health risks and health exposures of the consumer by an underwriter. The underwriting module 204b determines debit points for pre-existing medical conditions of the consumer. The underwriter approves or rejects the consumer for the health plans based on the debit points calculated for the consumer. The underwriting module 204b then sends the generated insurance quotes to the sales portal 201 via the network 207. The underwriting module 204b also renews the health plans and the insurance quotes for the consumer and sends the renewed health plans and insurance quotes to the sales portal 201 via the network 207.

The billing and commissions engine 204c bills the consumer for the enrolled health plans based on the insurance quotes generated by the health plan selection module 201b of the sales portal 201. The billing and commissions engine 204c generates invoices for the consumer based on the insurance quotes. In the case of an inclusion or a removal of a member in a group of a company, the billing and commissions engine 204c recalculates the invoices and renews the invoices for the enrolled health plans. The billing and commissions engine 204c also renews invoices for the consumer, in the case of payment deficits, over payments by the consumer, and a change in the health plans. The renewed invoices are sent to one of the member portal 202 and the employer portal 203 via the network 207. The invoices may be tracked for payment by the consumer using the billing and commissions engine 204c. The billing and commissions engine 204c sends reminders to the consumer for the payment. The billing details comprising the invoices, status of payment, billing cycle, and reminders for the payment are stored in the portal database 206.

The billing and commissions engine 204c generates commissions for the sales agent based on the enrolled health plans. In the case of an inclusion or a removal of a member in a group of a company, the billing and commissions engine 204c recalculates the commissions and renews the commissions for the sales agent. The billing and commissions engine 204c generates commissions as remuneration for the health plans sold by the sales agent. The billing and commissions engine 204c sends the commissions information to the sales portal 201 via the network 207. Commission payments may be made to the sales agent using an electronic deposit method.

The customer services module 204d of the administration portal 204 resolves service issues, complaints, grievances, and non medical appeals of the consumer. The customer services module 204d communicates with the sales portal 201, the member portal 202, the employer portal 203, the administration portal 204, and the provider portal 205 via the network 207 using secured communication. Further, secured messaging ability is provided between all the components of the computer implemented system 200. The consumer may submit service issues, complaints or grievances online to the customer services module 204d using one of the member portal 202 and the employer portal 203. Further, the administration and maintenance activity module 204e is used to manage and control all other administrative and maintenance activities of the health plan organization.

Based on the health plans or insurance company policies and business rules, the health plan organization allows employers to add or terminate members from the group roster within a certain number of days. The employer may add or terminate members from the group using the group roster management module 203c. The administration portal 204 allows the health plan organization to dynamically control the number of days by using a configurable parameter represented by the alphabet "x". The health plan organization may change the configurable parameter "x" as the health plan organization's policies change to allow the employer to make roster changes retro-actively or for future dates. In some cases, the sales agent may act as the roster manager for a group after receiving authorization from the employer.

Figure 3:
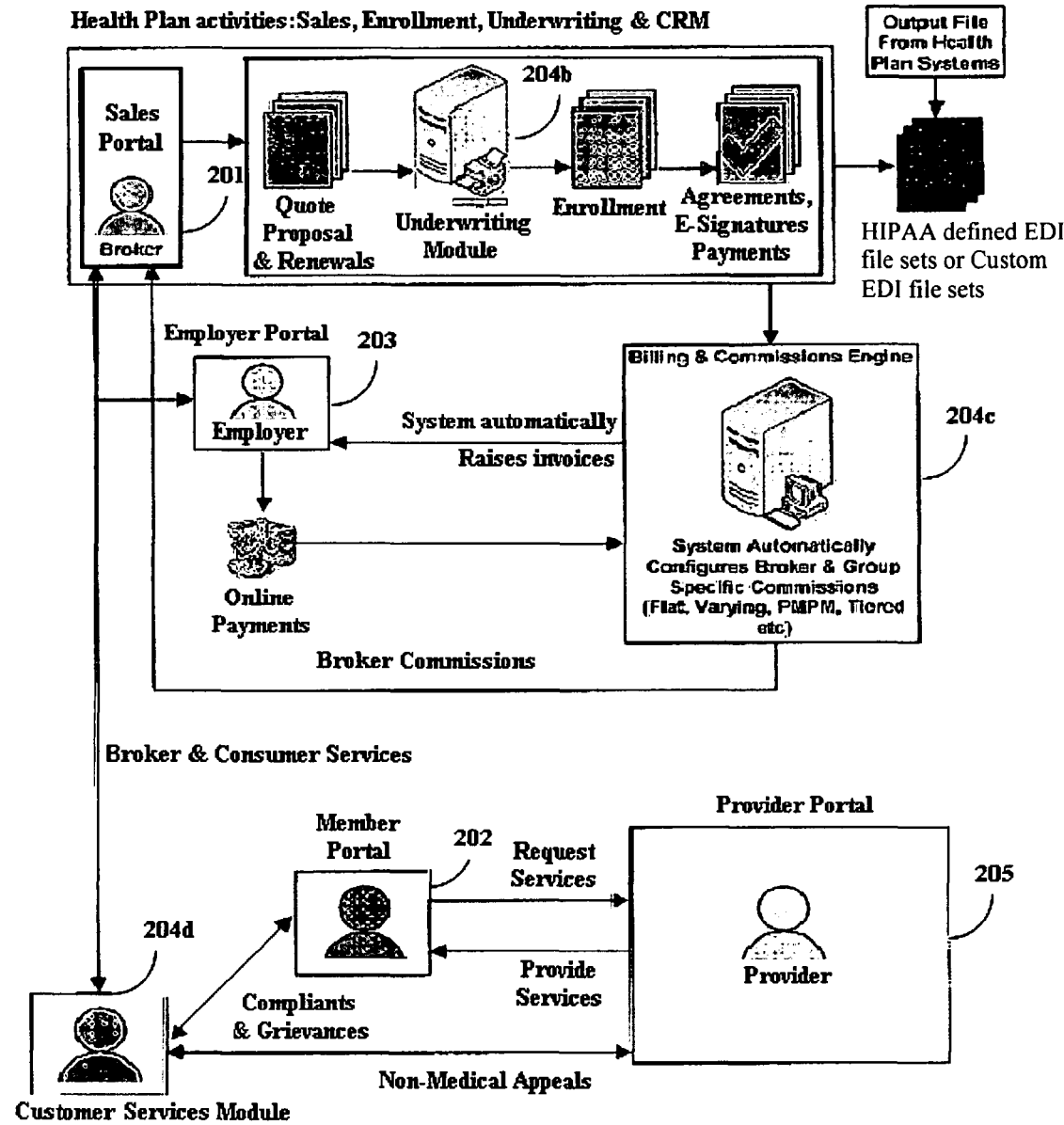
FIG. 3 exemplarily illustrates the interaction of various business processes using the plurality of portals in a health plan organization.

FIG. 3 exemplarily illustrates the interaction of various business processes using the plurality of portals in a health plan organization. The administration portal 204 communicates and coordinates the sales portal 201, the member portal 202, the employer portal 203, and the provider portal 205 used by a plurality of departments in the health plan organization. The portals communicate with the administration portal 204 via the network 207. For example, the administration portal 204 authorizes the sales agent to access the sales portal 201. A plurality of health plans is listed using the sales portal 201. The health plans listed in the sales portal 201 include, but not limited to, commercial health plans, Medicare health plans, Medicaid health plans and other health plans including dental plans, life insurance, vision insurance, long term disability insurance plans, short term disability insurance plans, etc. The sales agent proposes at least one of the plurality of health plans to the consumer using the sales portal 201. Insurance quotes are generated for the proposed health plans using the administration portal 204. The administration portal 204 may alter the generated insurance quotes based on the on the evaluation of the health risks and health exposures of the consumer by an underwriter. The generated insurance quotes are then sent to the sales portal 201 from the administration portal 204 via the network 207. The administration portal 204 authorizes the consumer to gain access to one of the member portal 202 and the employer portal 203. The consumer enrolls for at least one of the health plans proposed by the sales agent using one of the member portal 202 and the employer portal 203. The administration portal 204 also coordinates the provision of health care services defined by the enrolled health plans to the consumer by a provider using the provider portal 205 as illustrated in FIG. 3. The administration portal 204 then bills the consumer for the enrolled health plans based on the insurance quotes using a billing and commissions engine 204c. The billing details comprising the invoices, status of payment, billing cycle, and reminders for the payment are stored in the portal database 206. The consumer then pays a premium amount online for the enrolled health plans using one of the member portal 202 and the employer portal 203. The administration portal 204 also generates commissions for the sales agent for the enrolled health plans. The commissions generated by the administration portal 204 are then sent to the sales portal 201 for viewing by the sales agent.

It will be readily apparent that the various methods and algorithms described herein may be implemented in a computer readable medium appropriately programmed for general purpose computers and computing devices. Typically a processor, for e.g., one or more microprocessors will receive instructions from a memory or like device, and execute those instructions, thereby performing one or more processes defined by those instructions. Further, programs that implement such methods and algorithms may be stored and transmitted using a variety of media, for e.g., computer readable media in a number of manners. In one embodiment, hard-wired circuitry or custom hardware may be used in place of, or in combination with, software instructions for implementation of the processes of various embodiments. Thus, embodiments are not limited to any specific combination of hardware and software. A 'processor' means any one or more microprocessors, Central Processing Unit (CPU) devices, computing devices, microcontrollers, digital signal processors or like devices. The term 'computer-readable medium' refers to any medium that participates in providing data, for example instructions that may be read by a computer, a processor or a like device. Such a medium may take many forms, including but not limited to, non-volatile media, volatile media, and transmission media. Non-volatile media include, for example, optical or magnetic disks and other persistent memory volatile media include Dynamic Random Access Memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during Radio Frequency (RF) and Infrared (IR) data communications. Common forms of computer-readable media include, for example, a floppy disk, a flexible disk, hard disk, magnetic tape, any other magnetic medium, a Compact Disc-Read Only Memory (CD-ROM), Digital Versatile Disc (DVD), any other optical medium, punch cards, paper tape, any other physical medium with patterns of holes, a Random Access Memory (RAM), a Programmable Read Only Memory (PROM), an Erasable Programmable Read Only Memory (EPROM), an Electrically Erasable Programmable Read Only Memory (EEPROM), a flash memory, any other memory chip or cartridge, a carrier wave as described hereinafter, or any other medium from which a computer can read. In general, the computer-readable programs may be implemented in any programming language. Some examples of languages that can be used include C, C++, C#, or JAVA. The software programs may be stored on or in one or more mediums as an object code. A computer program product comprising computer executable instructions embodied in a computer-readable medium comprises computer parsable codes for the implementation of the processes of various embodiments.

Where databases are described such as the portal database 206, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats including relational databases, object-based models and/or distributed databases could be used to store and manipulate the data types described herein. Likewise, object methods or behaviors of a database can be used to implement various processes, such as the described herein. In addition, the databases may, in a known manner, be stored locally or remotely from a device that accesses data in such a database.

The present invention can be configured to work in a network environment including a computer that is in communication, via a communications network, with one or more devices. The computer may communicate with the devices directly or indirectly, via a wired or wireless medium such as the Internet, Local Area Network (LAN), Wide Area Network (WAN) or Ethernet, Token Ring, or via any appropriate communications means or combination of communications means. Each of the devices may comprise computers, such as those based on the Intel.®. processors, AMD.®. processors, UltraSPARC.®. processors, etc, that are adapted to communicate with the computer. Any number and type of machines may be in communication with the computer.

The foregoing examples have been provided merely for the purpose of explanation and are in no way to be construed as limiting of the present method and system disclosed herein. While the invention has been described with reference to various embodiments, it is understood that the words, which have been used herein, are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

We claim:

1. A computer implemented system for automating business processes of a health plan organization, comprising:
a plurality of portals comprising:
a sales portal for listing a plurality of health plans and proposing at least one of said plurality of health plans to a consumer by a sales agent, wherein said consumer is one of a member and an employer;
a member portal comprising a member enrollment and maintenance module for enrolling for at least one of said proposed health plans by said member;
an employer portal comprising an employer enrollment and maintenance module for enrolling for at least one of the proposed health plans by said employer, wherein the employer provides health care benefits to a group of members of a company through the proposed health plans;
a provider portal for rendering health care services by a provider defined by said enrolled health plans to the consumer;
an administration portal for coordinating said business processes of said plurality of portals, comprising:
a rating engine for generating insurance quotes for the proposed health plans; and
a billing and commissions engine for billing the consumer for the enrolled health plans based on said insurance quotes and for generating commissions for said sales agent for the enrolled health plans;
wherein said sales portal further comprises a sales agent registration module for registering the sales agent with said health plan organization, wherein said registered sales agent is authorized via an electronic correspondence compliant with Health Insurance Portability and Accountability Act standards;
wherein said sales portal further comprises a health plan selection module for selecting said health plans, and proposing at least one of said selected health plans to the consumer;
wherein said administration portal further comprises an authorization engine for authorizing the member and the employer to access said member portal and said employer portal respectively;
wherein said administration portal further comprises an underwriting module for evaluating health risks and health exposures of the consumer;
wherein said underwriting module renews health plans and the insurance quotes for the consumer;
wherein said billing and commissions engine generates invoices for the consumer based on the insurance quotes; and
wherein the billing and commissions engine tracks payment of said invoices by the consumer and sends reminders to the consumer for said payment.

2. The computer implemented system of claim 1 further comprising a portal database for storing sales agent information, consumer information, group census information, billing details, and commissions information.

3. The computer implemented system of claim 2, wherein said sales agent information comprises sales agent identification, sales agent login details, and summary of sales agent commissions.

4. The computer implemented system of claim 2, wherein said consumer information comprises login details of the consumer, contact information of the consumer, medical history details of the consumer, a summary of the enrolled health plans of the consumer, consumer identification number, consumer name, date of service, type of service, provider details, total billable service details, and amounts of service charges.

5. The computer implemented system of claim 2, wherein said group census information comprises information obtained from a group of members receiving health care benefits from the employer of a company.

6. The computer implemented system of claim 2, wherein said billing details comprise invoices, status of payment, billing cycle, and reminders for said payment.

7. The computer implemented system of claim 1, wherein said administration portal further comprises a customer services module for resolving complaints, grievances, and non medical appeals of the consumer.

8. The computer implemented system of claim 1, wherein said administration portal further comprises a administration and maintenance activity module for managing and controlling the administrative and maintenance activities of the health plan organization.

9. The computer implemented system of claim 1, wherein said member portal further comprises a member payment module for making payments by the member for the enrolled health plans.

10. The computer implemented system of claim 1, wherein said employer portal further comprises an employer payment module for making payments by the employer for the enrolled health plans.

11. The computer implemented system of claim 1, wherein said employer portal further comprises a group roster management module for managing said group of members of said company enrolled for said health plans by the employer.

12. The computer implemented system of claim 1, wherein said provider portal comprises a consumer information maintenance module for maintaining and managing information of the consumer associated with said provider, submitting and tracking the status of provider claims, and viewing status of membership of the consumer.

* * * * *